(12) United States Patent
Allspaw et al.

(10) Patent No.: US 10,990,247 B1
(45) Date of Patent: Apr. 27, 2021

(54) SYSTEM AND METHOD FOR ANALYSIS AND VISUALIZATION OF INCIDENT DATA

(71) Applicant: Adaptive Capacity Labs, LLC, Brooklyn, NY (US)

(72) Inventors: John Allspaw, Brooklyn, NY (US); Richard Cook, Chicago, IL (US); Christopher Fairbanks, Barkhamsted, CT (US)

(73) Assignee: Adaptive Capacity Labs, LLC, Brooklyn, NY (US)

( * ) Notice: Subject to any disclaimer, the term of this patent is extended or adjusted under 35 U.S.C. 154(b) by 0 days.

(21) Appl. No.: 17/076,724

(22) Filed: Oct. 21, 2020

(51) Int. Cl.
*G06F 3/0482* (2013.01)
*G06F 3/0481* (2013.01)
*G06T 11/00* (2006.01)

(52) U.S. Cl.
CPC ........ *G06F 3/0482* (2013.01); *G06F 3/04817* (2013.01); *G06T 11/00* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 9,823,818 B1* | 11/2017 | Ryan | G06F 3/0482 |
| 2010/0185933 A1* | 7/2010 | Coffman | G06Q 10/10 715/230 |
| 2010/0287481 A1* | 11/2010 | Sawada | G06Q 10/109 715/751 |
| 2015/0154269 A1* | 6/2015 | Miller | G06F 16/2477 715/780 |
| 2016/0125667 A1* | 5/2016 | Phillips | G07C 5/0808 701/29.3 |
| 2018/0267947 A1* | 9/2018 | Miller | G06F 16/2477 |
| 2019/0164633 A1* | 5/2019 | Ingel | G16H 40/63 |
| 2019/0354559 A1* | 11/2019 | Sabhanatarajan | G06F 16/901 |
| 2020/0013124 A1* | 1/2020 | Obee | G06N 20/00 |

* cited by examiner

*Primary Examiner* — Toan H Vu
(74) *Attorney, Agent, or Firm* — Stoyanov Law PLLC; Roy L. Chan

(57) ABSTRACT

Apparatus and method for investigating an analyzable incident for a period of time has a database to receive and store data sets, coupled to a data processing computer system that operates upon the data sets, and a display module comprising a graphical user interface ("GUI"). Each data set comprises a series of events comprising a timestamp, a source, and a content about the analyzable incident. The GUI comprises an event map, a control panel, and an annotation panel viewable in an event list view or a swimlane view. The event list view has a tabular list of the timestamp, source, and the content of each event. The swimlane view comprises a graphical representation of the timestamp and the source of each event, and a user selectable icon associated with the content of each event.

16 Claims, 17 Drawing Sheets

SYSTEM AND METHOD FOR ANALYSIS AND VISUALIZATION OF INCIDENT DATA

CROSS-REFERENCE TO RELATED APPLICATIONS

Not Applicable

STATEMENT REGARDING FEDERALLY SPONSORED RESEARCH OR DEVELOPMENT

[Not Applicable]

REFERENCE TO SEQUENCE LISTING, A TABLE, OR A COMPUTER PROGRAM LISTING COMPACT DISC APPENDIX

[Not Applicable]

BACKGROUND OF THE INVENTION

The present invention is related to methods and systems for analyzing and visualizing data collected during an incident. An incident as used in the description may be any event, accident, or occurrence of any duration, for example, airplane or other vehicle accident, network security breach, denial of service attack, power outages, professional conventional sports or e-sports competitions. Investigators may collect various data related to an incident to analyze the incident. Data may be available from one or multiple sources, and may include communications between incident participants or observers, video or audio recordings, images, sensor data, alerts, notifications, alarms data and others.

The various embodiments of the invention greatly facilitate the processing and analysis of data associated with the incident, by aiding the investigation of an incident and providing information for an incident investigator to use, for example, in interviewing, collecting additional information, facilitating group debriefing or post incident discussions.

BRIEF SUMMARY OF THE INVENTION

An embodiment of the present invention is an apparatus for investigating an analyzable incident for a period of time, comprising a database that receives and stores one or more data sets for the period of time, a data processing computer system coupled to the database that operates upon the one or more data sets, and a display module coupled to the data processing computer system. Each of the one or more data sets comprises a series of events about the analyzable incident. Each event comprises a timestamp, a source, and a content. The data processing computer system obtains the one or more data sets. The display module displays a graphical user interface, enables a user to select displayable events from the series of events in the one or more data sets, and enables the user to annotate each displayable event. The graphical user interface comprises a control panel and an annotation panel displaying each displayable event within a display time interval. The annotation panel is viewable in an event list view or a swimlane view. The event list view comprises a tabular list of the timestamp, the source and the content of each event. Each event has an associated user control. The associated user control allows the user to annotate each event by utilizing the associated user control. The associated user control allows the user to view the annotation panel in the swimlane view by utilizing the associated user control. The swimlane view comprises a graphical representation of the timestamp and the source of each event, and at least one user selectable icon associated with the content of each event. The timestamps are represented on a vertical (y) axis of an x-y axis and the sources are represented on a horizontal (x) axis. The user selectable icon allows the user to annotate each event by utilizing the user selectable icon. The user selectable icon allows the user to view the annotation panel in the event list view by utilizing the user selectable icon.

In another embodiment of the present invention, the graphical user interface further comprises an event mapping panel displaying a visual representation of all the displayable events. The event mapping panel comprises a user selectable graphic indicating the display time interval. The user selectable graphic allows the user to select a changed display time interval. In response to the user selecting the changed display time interval utilizing the user selectable graphic, the annotation panel displays each displayable event within the changed display time interval.

In yet another embodiment of the present invention, the control panel comprises a control panel user control allowing the user to select an adjusted display time interval. In response to the user selecting the adjusted display time interval, the user selectable graphic of the event mapping panel indicates the adjusted display time interval. In response to the user selecting the adjusted display time interval, the annotation panel displays each displayable event within the adjusted display time interval.

In another embodiment of the present invention, the display module further enables the user to create one or more tags and to create one or more event collections. The associated user control and the user selectable icon allow the user to annotate each displayable event by adding the one or more tags to the event. The associated user control and the user selectable icon allow the user to annotate each displayable event by including the event into the one or more event collections. The swimlane view further comprises a graphical representation of each displayable event visually indicating the event's inclusion in the one or more event collections. The user selectable icon visually indicates any of the one or more tags added to the event.

In yet another embodiment of the present invention, the event mapping panel visually indicates the one or more tags added to each displayable event.

In another embodiment of the present invention, the event mapping panel visually indicates each displayable event's inclusion in the one or more event collections.

In yet another embodiment of the present invention, the associated user control allows the user to hide/unhide the one or more data sets and to hide/unhide the source.

In another embodiment of the present invention, the control panel user control allows the user to select which of the one or more tags to be visually represented in the displayable event. The control panel user control allows the user to select which of the one or more tags to be included in which of the one of more event collections to be visually indicated in the displayable event.

Another embodiment of the present invention is a computer-implemented method for interactive visualization of data about an analyzable incident and for investigating the analyzable incident for a period of time. The method comprises obtaining one or more data sets for the period of time by a data processing computer system coupled to a database, storing the one or more data sets on the database, and displaying a graphical user interface on a display module coupled to a data processing computer system. Each of the one or more data sets comprises a series of events about the analyzable incident during the period of time. Each event comprises a timestamp, a source, and a content. The display module enables a user to select displayable events from the series of events in the one or more data sets. The display module enables the user to annotate each displayable event. The graphical user interface comprises a control panel and an annotation panel displaying each displayable event within a display time interval. The annotation panel is viewable in an event list view or a swimlane view. The event list view comprises a tabular list of the timestamp, the source and the content of each event. Each event has an associated user control. The associated user control allows the user to annotate each event by utilizing the associated user control. The associated user control allows the user to view the annotation panel in the swimlane view by utilizing the associated user control. The swimlane view comprises a graphical representation of the timestamp and the source of each event, and at least one user selectable icon associated with the content of each event. The timestamps are represented on a vertical (y) axis of an x-y axis and the sources are represented on a horizontal (x) axis. The user selectable icon allows the user to annotate each event by utilizing the user selectable icon. The user selectable icon allows the user to view the annotation panel in the event list view by utilizing the user selectable icon.

In yet another embodiment of the present invention, the graphical user interface further comprises an event mapping panel displaying a visual representation of all the displayable events. The event mapping panel comprises a user selectable graphic indicating the display time interval. The user selectable graphic allows the user to select a changed display time interval. In response to the user selecting the changed display time interval utilizing the user selectable graphic, an annotation display panel displays each displayable event within the changed display time interval.

In another embodiment of the present invention, the control panel comprises a control panel user control allowing the user to select an adjusted display time interval. In response to the user selecting the adjusted display time interval, the user selectable graphic of the event mapping panel indicates the adjusted display time interval. In response to the user selecting the adjusted display time interval, the annotation panel displays each displayable event within the adjusted display time interval.

In yet another embodiment of the present invention, the display module further enables the user to create one or more tags and to create one or more event collections. The associated user control and the user selectable icon allow the user to annotate each displayable event by adding the one or more tags to the event. The associated user control and the user selectable icon allow the user to annotate each displayable event by including the event into the one or more event collections. The swimlane view further comprises a graphical representation of each displayable event visually indicating the event's inclusion in the one or more event collections. The user selectable icon visually indicates any of the one or more tags added to the event.

In another embodiment of the present invention, the event mapping panel visually indicates the one or more tags added to each displayable event.

In yet another embodiment of the present invention, the event mapping panel visually indicates each displayable event's inclusion in the one or more event collections.

In another embodiment of the present invention, the associated user control allows the user to hide/unhide the one or more data sets and to hide/unhide the source.

In yet another embodiment of the present invention, the control panel user control allows the user to select which of the one or more tags to be visually represented in the displayable event. The control panel user control allows the user to select which of the one or more tags to be included in which of the one of more event collections to be visually indicated in the displayable event.

BRIEF DESCRIPTION OF THE SEVERAL VIEWS OF THE DRAWING

The advantages and features of the present invention will be better understood as the following description is read in conjunction with the accompanying drawings, wherein.

Figure 1:
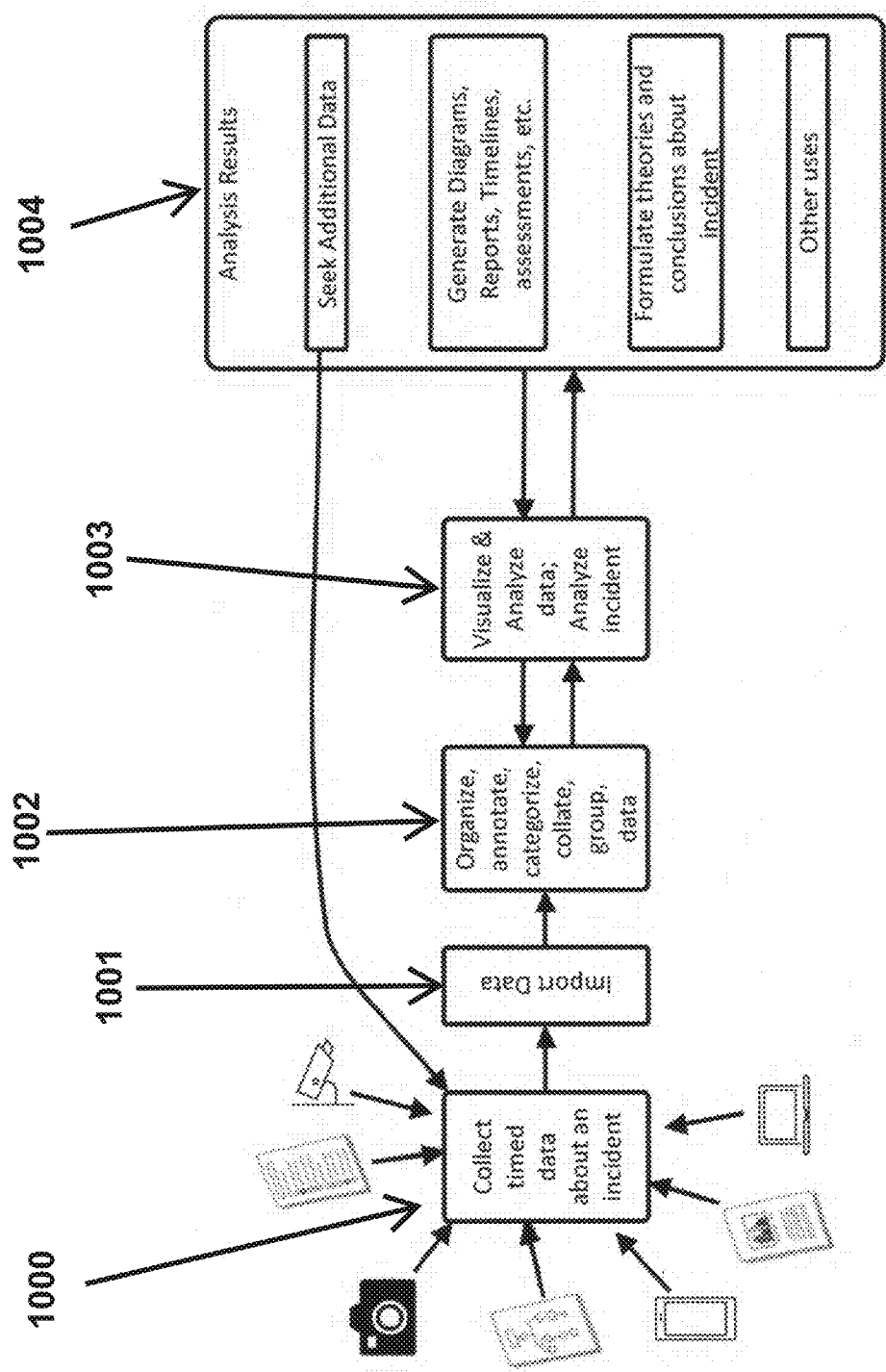
FIG. 1 is a diagram of an embodiment of the present invention.

For clarity purposes, all reference numerals may not be included in every figure.

DETAILED DESCRIPTION OF THE INVENTION

Embodiments of this invention may be implemented as systems comprising data storage, graphical displays, user controls, and computing interfaces between the graphical display, data storage, and user controls. Embodiments may be implemented on a single computing device, or may be implemented with distributed system architecture, such as a client device/workstation to graphically display data, a database, and any number of hardware and/or software layers in between.

An embodiment of the invention may be utilized and function as illustrated in FIG. 1, wherein incident data (e.g., data and other information about an incident) is collected in step 1000 and in step 1001 imported into a computer system configured to operate according to the invention. In step 1002 the data maybe aggregated and manipulated by grouping, sorting, annotating, categorizing, collating, and other methods of data aggregation, manipulation and organization to facilitate the analysis of the incident. The data may subsequently, in 1003, be visualized in different views, allowing an investigator, as step 1004, to obtain diagrams for incident reports, timeline of multiple events occurring before, during or after an incident.

Figure 2:
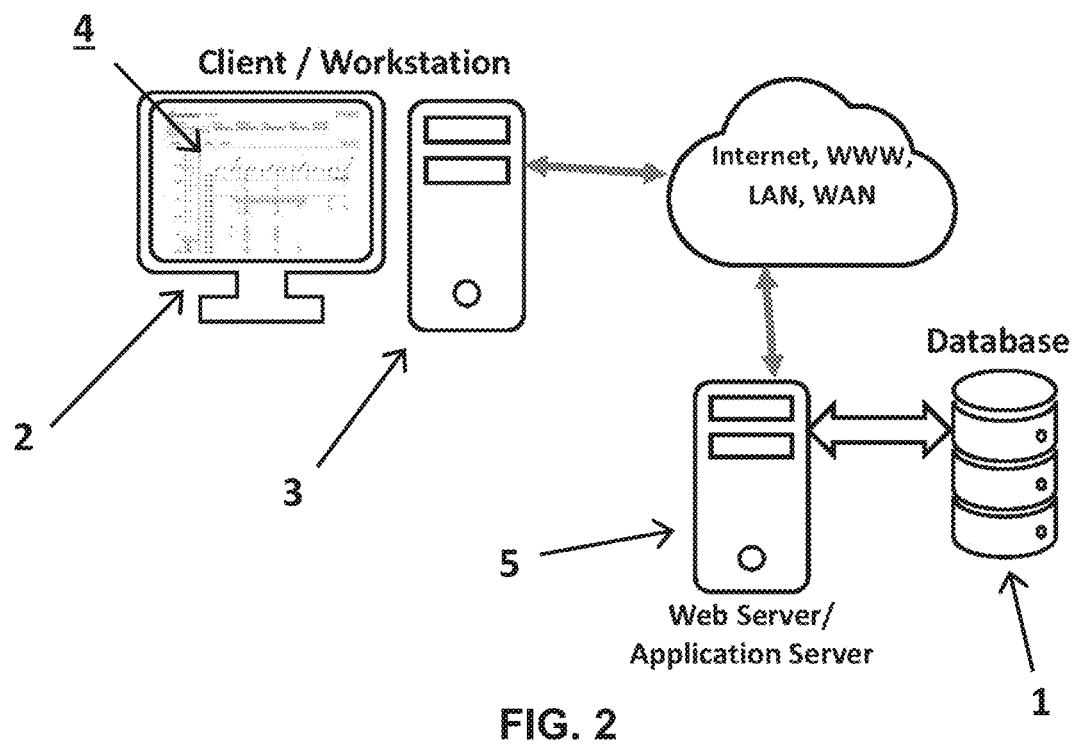
FIG. 2 is a diagram of an embodiment of the present invention.

In a preferred embodiment, illustrated in FIG. 2, the present invention maybe implemented as a distributed network system utilizing one or more Databases 1 and one or more workstations 3, comprising a display module 2, for displaying, visualizing and manipulating incident data stored in Database 1 through a Graphical User Interface ("GUI") 4. This embodiment may also comprise an Application Server 5 as a computing interface between Database 1, display module 2, workstation 3, and GUI 4. The GUI 4 provides efficient navigation through multiple views of the data associated with an incident. The Database 1 maybe a relational or non-relational database, by way of example, MySql, SQL, Oracle, Mongo, Cassandra, ElasticSearch and many others. In this embodiment, the Workstation 3 maybe any computing device such as a personal computer, laptop, tablet, mobile device, thin client, or any other device capable of displaying the GUI and connecting to a network (e.g., Internet, WWW, internal networks, and other public or private networks). The display module 2 may be any display module comprising a display (e.g., monitor, screen, projector, etc.) and a display controller (e.g., display hardware and software controlling the display), as well as any other hardware or software instrumentality, or interface known in the industry and necessary to properly operate the display module. In a preferred embodiment the display module 2 maybe part of workstation 3. Workstation 3 may display the GUI using a web browser capable of displaying any type of markup language (e.g., HTML, XML, SGML, etc.) or any other program capable of accessing and displaying information from a network. In an embodiment with more than one workstations 3, or display modules 2, each workstation/display module may display different aspects of the GUI 4 (e.g., input, control, annotation) permitting different users to perform different actions. Embodiments of the invention may also comprise firewalls or other security measures (not shown) between the Application Server 5 and a network, or between the workstation 3 and a public network.

Figure 3:
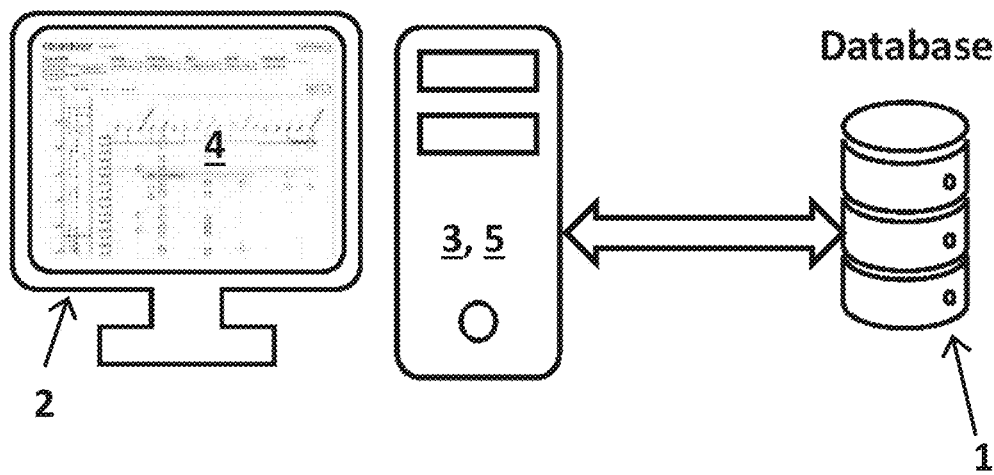
FIG. 3 is a diagram of an embodiment of the present invention.

Another embodiment illustrated in FIG. 3, may be implemented on a local network or even without any network connectivity. The Workstation 3, comprising display module 2, and Application Server 5 maybe on the same computing device connected to the Database 1 as illustrated on FIG. 3. In other embodiments (not illustrated) the Workstation, Application Server, and the Database may be implemented on a single computing device.

An embodiment of the invention is a tool that can be used to collate, explore, and analyze one or more timestamped data sets about an incident to facilitate researchers performing incident analysis by facilitating the process of analyzing timestamped data sets. Once imported into the tool, the data sets may be searched, organized, tagged, and annotated in various ways, including a temporal visualization (e.g., along a timeline). This greatly facilitates a user's ability to explore and analyze verbal, behavioral, audiovisual, technical, and other data as means to develop deeper understandings of an incident.

Figure 4:
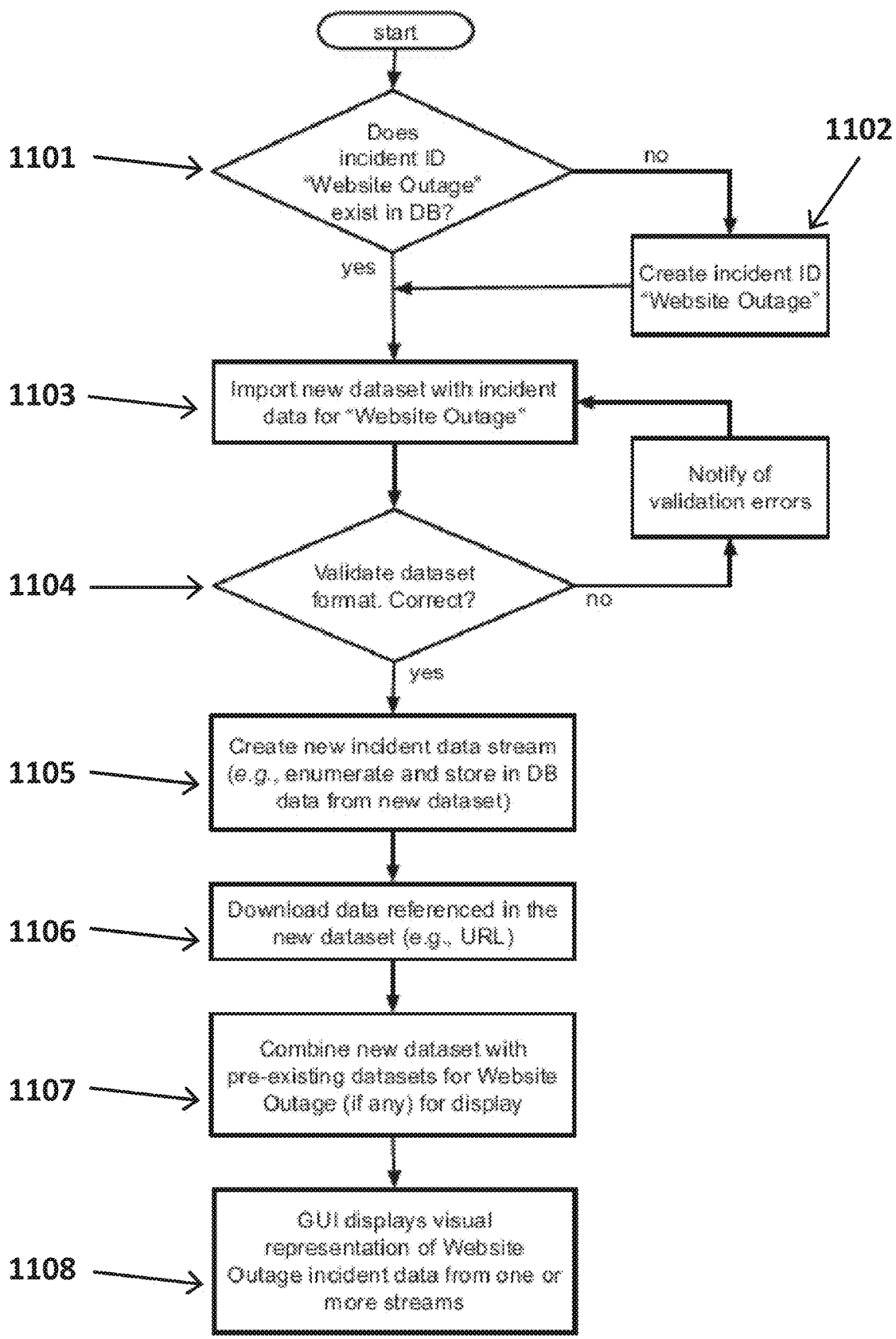
FIG. 4 is a diagram of a flowchart of an embodiment of the present invention.

FIG. 4 illustrates the use of an embodiment to visualize and analyze a website outage incident. If the incident has not been created, according to step 1101, in step 1102, a new incident "Website Outage" is created from the GUI 4. If the incident "Website Outage" already exists, the system skips 1102. In step 1103, a data set containing incident data associated with the Website Outage incident is imported, and the data set is validated in step 1104. If the data set format is correct, in step 1105 the incident data contained the data set is enumerated and stored in the Database 1 as an incident data stream. If any incident data content (e.g., image, video, object file, etc.) is provided by a link or reference (e.g., url, network or drive location) the content is retrieved from its referenced location in step 1106 and added to the stream. In step 1107 displayable incident data from all streams (e.g., enumerated incident data in data sets) associated with the Website Outage incident are aggregated for displaying, and in step 1108, the GUI displays a curated visual representation of the aggregated incident data permitting further manipulation, sortation, organization, annotation, tagging, grouping, etc.

An incident in steps 1101 and 1102 above refers to an analyzable incident, about which incident data exists, or can be collected, and organized into one or more data sets. An analyzable incident created within a system embodying the present invention comprises on or more incident identifiers, such as a name, title, label, number, or other identifier, corresponding to an analyzable incident. Incident data about the analyzable incident, including incident data from multiple data streams (e.g., enumerated data in data sets), may be associated with the incident identifiers for that incident thereby permitting all data to be manipulated and visualized as a whole. The incident identifiers maybe used in step 1107 to aggregate all displayable incident data from multiple data sets (or multiple streams) associated with the same analyzable incident.

The terms "stream" and "data set" are largely interchangeable for the purposes of the present description. A stream refers to enumerated data from a data set, which is stored in Database 1. A data set should be understood broadly to include any set, collection, or aggregation of incident data, in any form, that has been collected, created or provided in relation to an analyzable incident, including flat files (e.g., in CSV, TSV, XML, or other formats), data streams, or even a single datum. Data in a data set and in a stream is timed, for example by associating each datum with a timestamp. Examples of the incident data that can be found in a data set or a stream include: online chat records and logs (e.g., Slack, IRC, Microsoft Teams, etc.), text transcriptions of interviews, software application logs (e.g., app. error logs, access logs, etc.), audio or video recordings (e.g., video conferences, telephone "bridge" calls) or transcripts of such recordings, images, other records, traces, or artifacts produced by the anomalies, events, incidents, or accidents, including ex post facto interviews and summaries. Each datum in a data set or stream represents an event which was recorded as having occurred at its associated timestamp in the data set/stream. An event in a data set/stream may be a portion of text, portion of audio, portion of a videoframe, or one or more video frames, images or portions thereof, computer generated message, alphanumeric sequence, or any other information. An event's timestamp indicates a point in time when an event occurred, is believed to have occurred, or was recorded, and may be used to perform one or more of the following: (i) preserve the sequential order in which an event appears in a data set or among events in combined data sets; (ii) visualize or calculate the time between events; (iii) enable navigations within the data sets; (iv) allow displaying the correct event data depending on the selected time interval; (v) support correlation of these data with information from other sources; (vi) support inferences about communications between sources over time; (vii) support inferences about the ordering of related events. An event may also have an event duration, which may be used for visualizing concurrent or overlapping events, analyzing whether an event lasted too long or too short (e.g., an alarm going off for a long time unnoticed), whether an event did not complete properly or may have been interrupted, and various others. In situations where events represent communications, or request-response exchanges (e.g., transcript, trace, audio/visual format, etc.) event duration can help assess the circumstances, duration, and sequence of communications, for example whether a statement or action may or may not have been in response to a statement (e.g., if the response began prior to the end of duration of the statement).

Events also may have an event source or actor (e.g., the source of the datum corresponding to that event), which may be a person or device that produced the event (e.g., text, image, video, sound, alarm, computer notification, log entry, error code, etc.), for example a participant or observer of an incident, video or still camera, microphone, monitoring or trace software, computers, GPS trackers, sensors, and others. The actors, or event sources, of each event may be part of the data set. For this disclosure the terms "actor" and "event source" are used interchangeably.

Embodiments of the invention allow a user to assemble, validate, and explore all or parts of a data set, and multiple data sets associated with an incident, and to do so efficiently and non-destructively while producing a record of the user's activities. For example, an embodiment of the invention may perform one or more of: generating, manipulating, and comparing different views of data sets allowing a user to make inferences about anomalies, events, accidents or other occurrences associated with an incident; annotating the data sets so that user's inferences are recorded and become part of the enhanced data sets; and allowing the enhanced data together with the analytical references to be recorded, communicated, or supported by references to the original data sets. A user also may hide or unhide an entire stream/data set or the user may hide/unhide one or more individual actors (event sources). Events from a hidden stream are not displayable regardless of whether the actor is hidden or unhidden. Events associated with a hidden actor also are not displayable regardless if those events are part of a hidden or unhidden stream. Only events by unhidden actors in unhidden streams are displayable.

Figure 5:
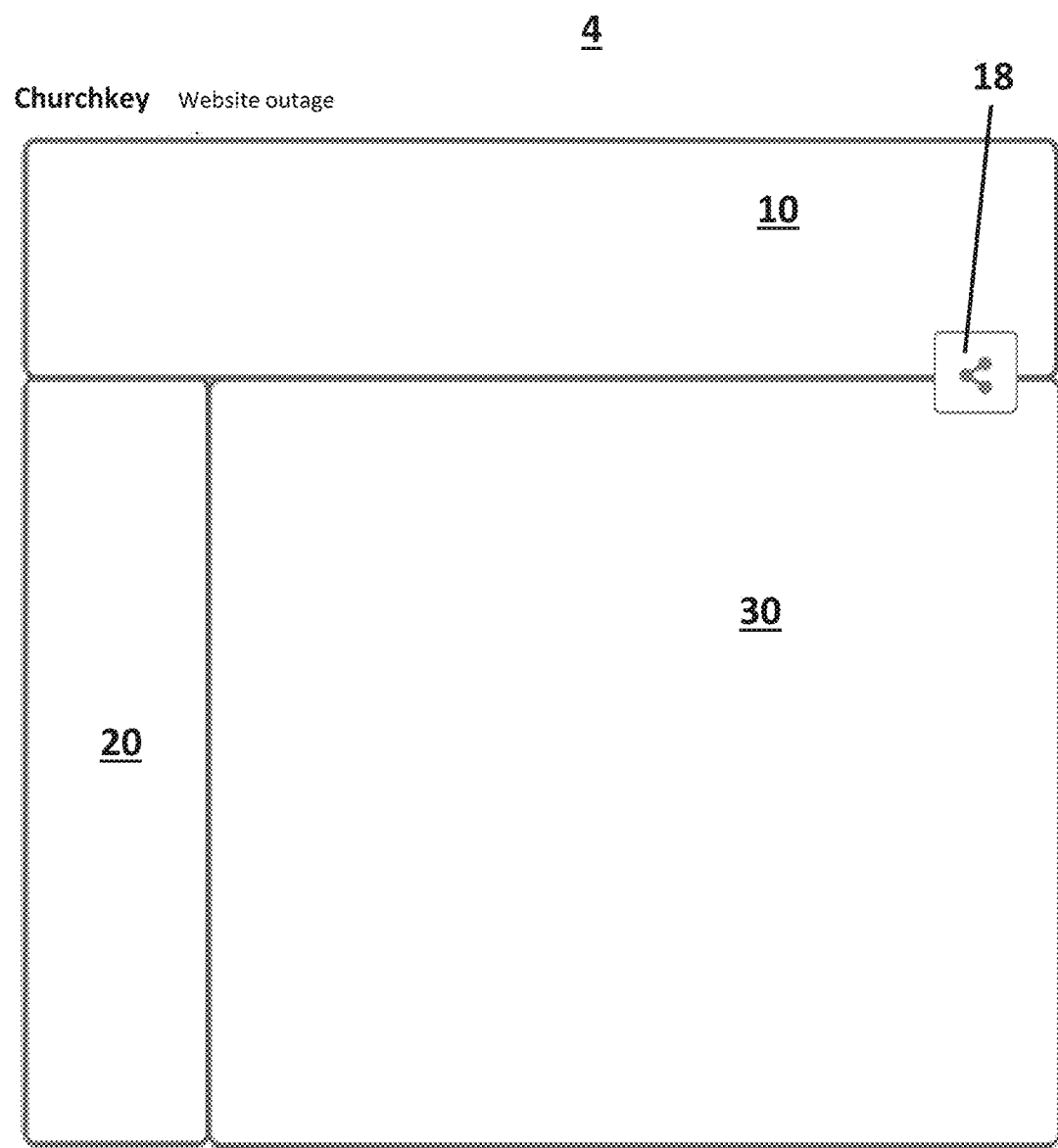
FIG. 5 is a diagram of a GUI in an embodiment of the present invention.
Figure 6:
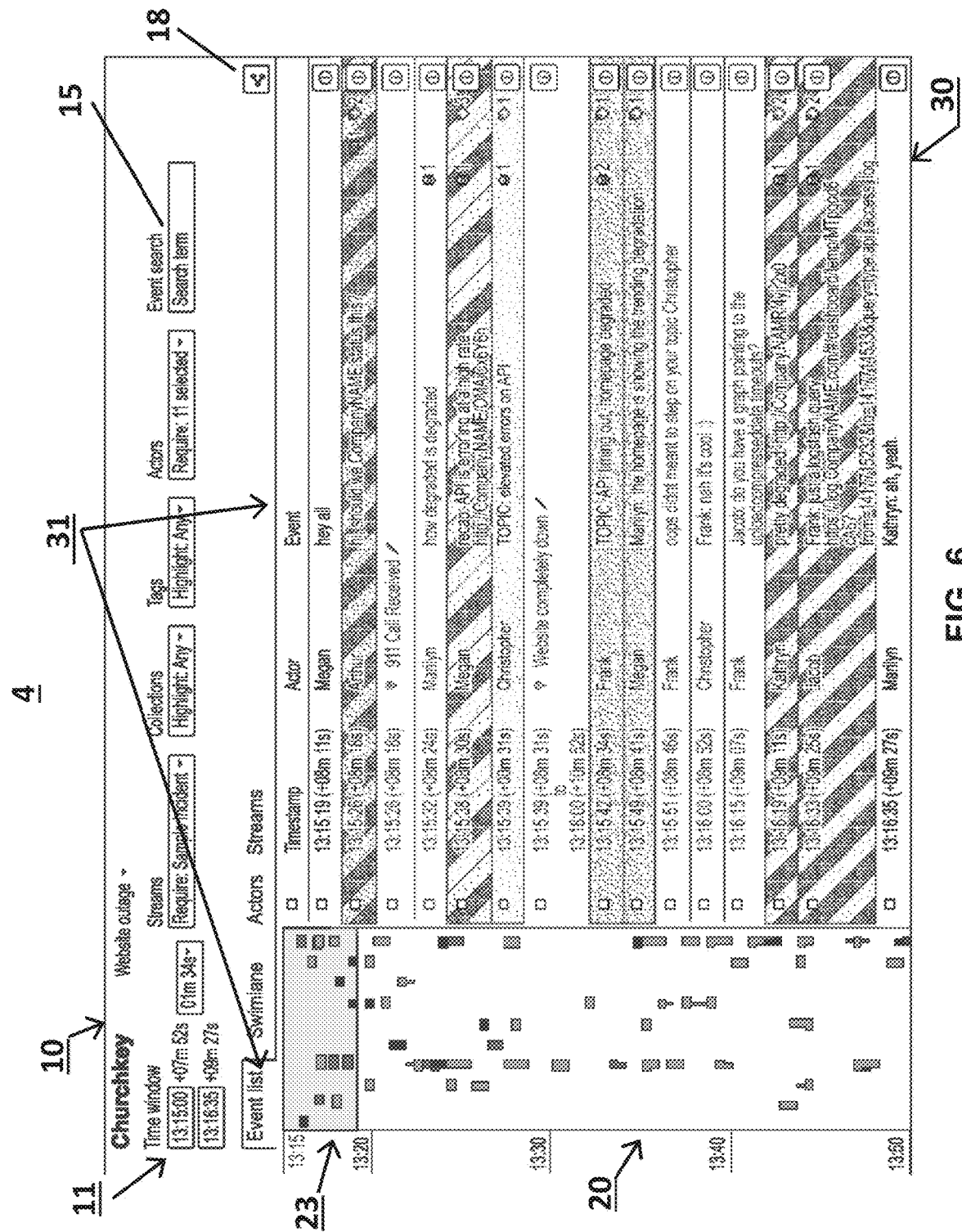
FIG. 6 is a diagram of a GUI in an embodiment of the present invention.
Figure 7:
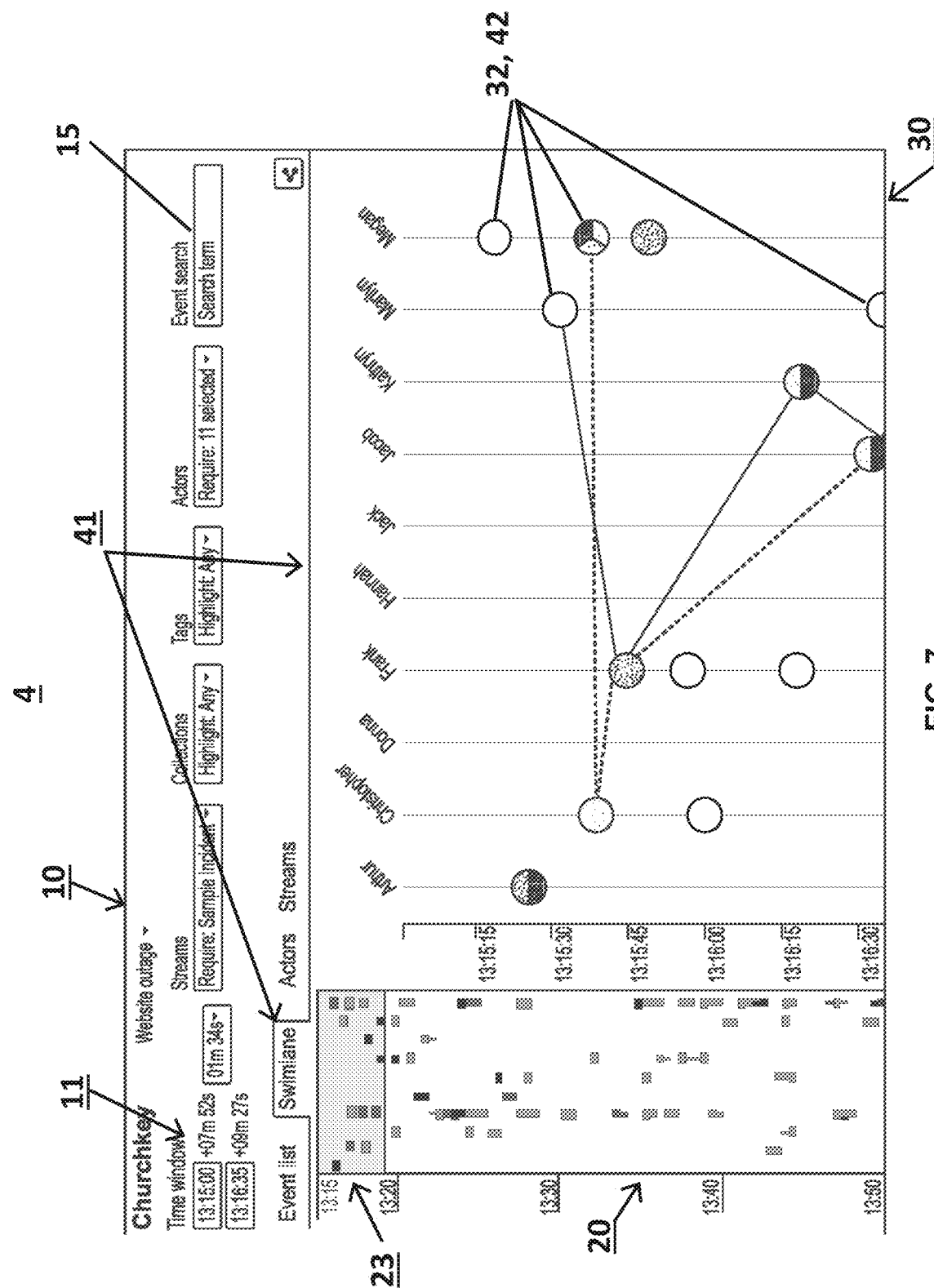
FIG. 7 is a diagram of a GUI in an embodiment of the present invention.

Displayable events are displayed in a Graphical User Interface 4, as illustrated in FIGS. 5, 6, 7. When displayable events originate from multiple data sets all displayable events are interleaved via their timestamps. The Graphical User Interface 4 comprises a Control Panel 10, Event Mapping Panel 20, and an Annotation Panel 30. The GUI Panels 10, 20, and 30, are logically and graphically related in a unique manner that allows data to be visualized in parallel different but related perspectives on the data sets being represented. Embodiments of the invention further allow a user to specify, or adjust (e.g., magnify, or reduce) the time interval displayed in the Annotation Panel 30, show or non-destructively (e.g., without altering the data sets) hide one or more event sources on the Annotation Panel 30. Embodiments of the invention also allow a user to switch the Annotation Panel between different views while maintaining the data manipulation and the time interval of displayed data between views. Embodiments of the invention also allow users to share the current visualization state of GUI 4 and/or display module 2 by using the Share Control 18. For example, clicking the Share Control 18 may cause the system to generate a reference (e.g., a URL) which represents the viewable state of the GUI 4 and display module 2 (e.g., displayable events, time filtering, display time interval, tags, collection, highlighting, and other data visualizations rules). The reference may then be shared with others (e.g., sitting at a different location) who upon following the reference will be able to view the GUI 4 in the state recorded by that reference.

Figure 10:
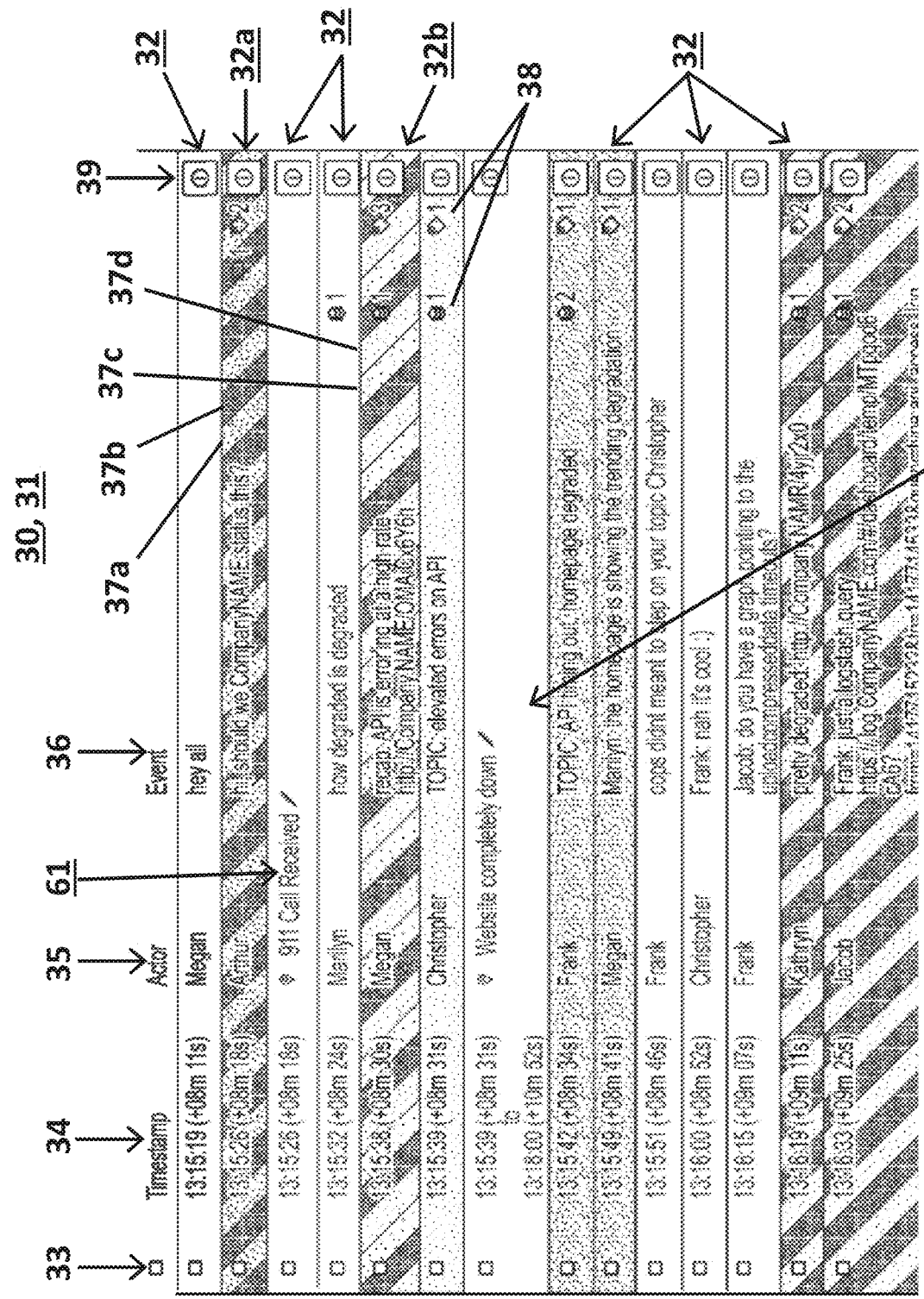
FIG. 10 is a diagram of an Event List View of a GUI in an embodiment of the present invention.
Figure 11:
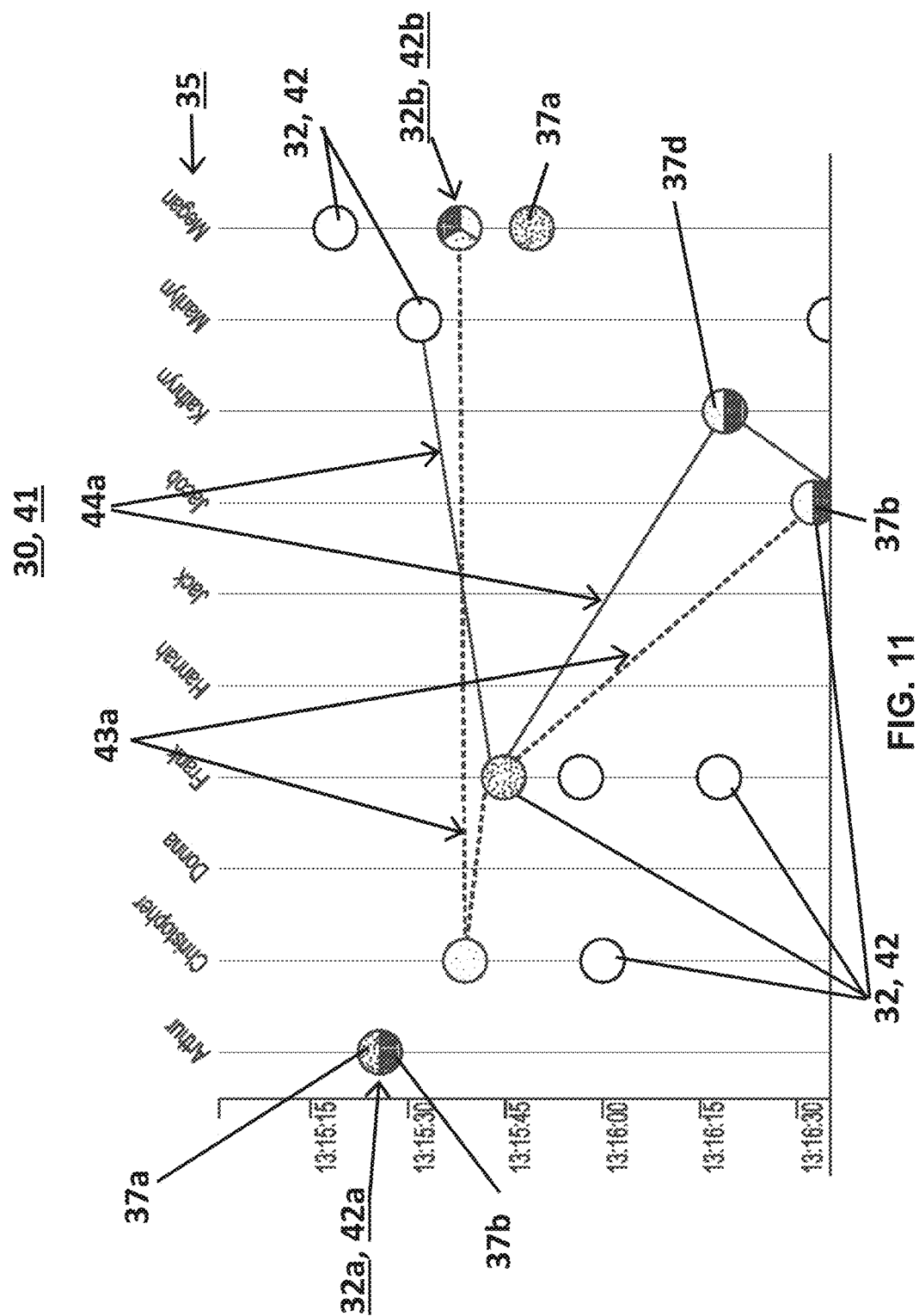
FIG. 11 is a diagram of a Swimlane View of a GUI in an embodiment of the present invention.
Figure 12:
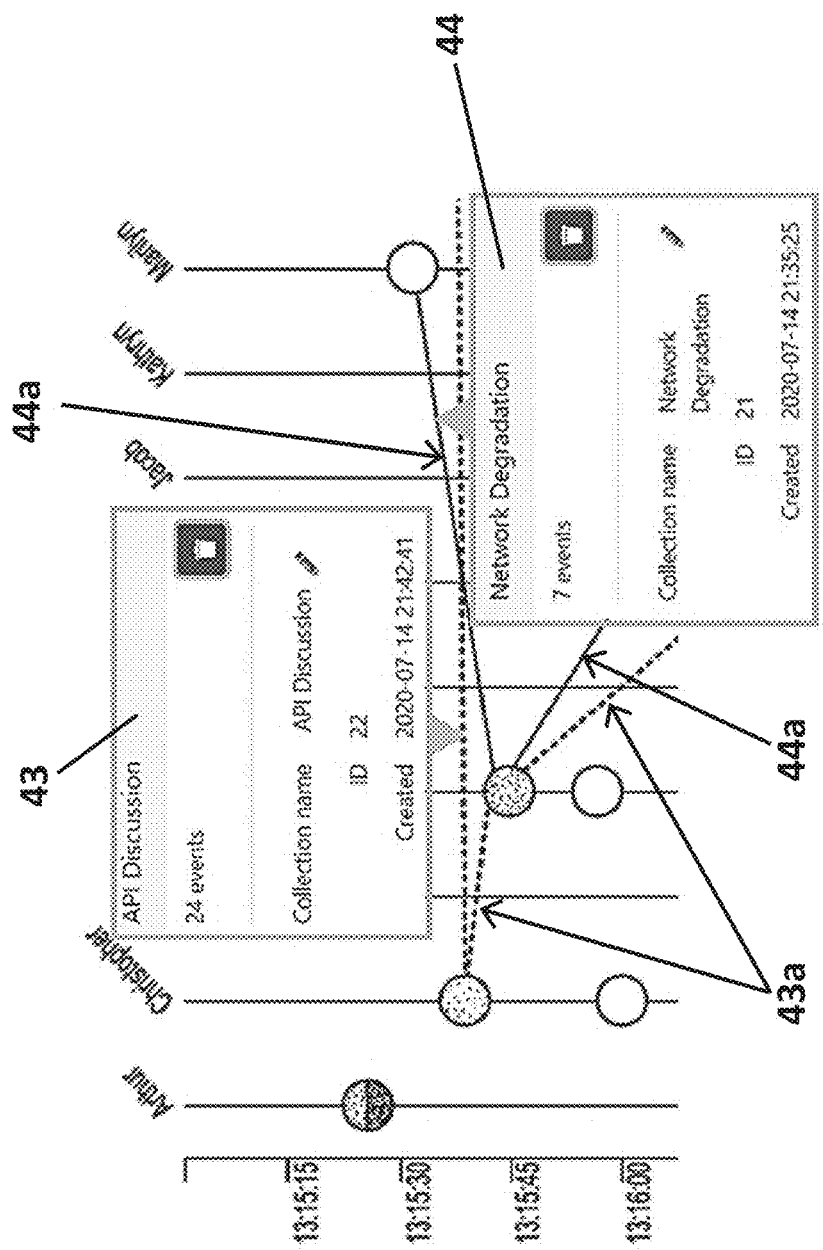
FIG. 12 is a diagram of visual user controls in an embodiment of the present invention.
Figure 15A:
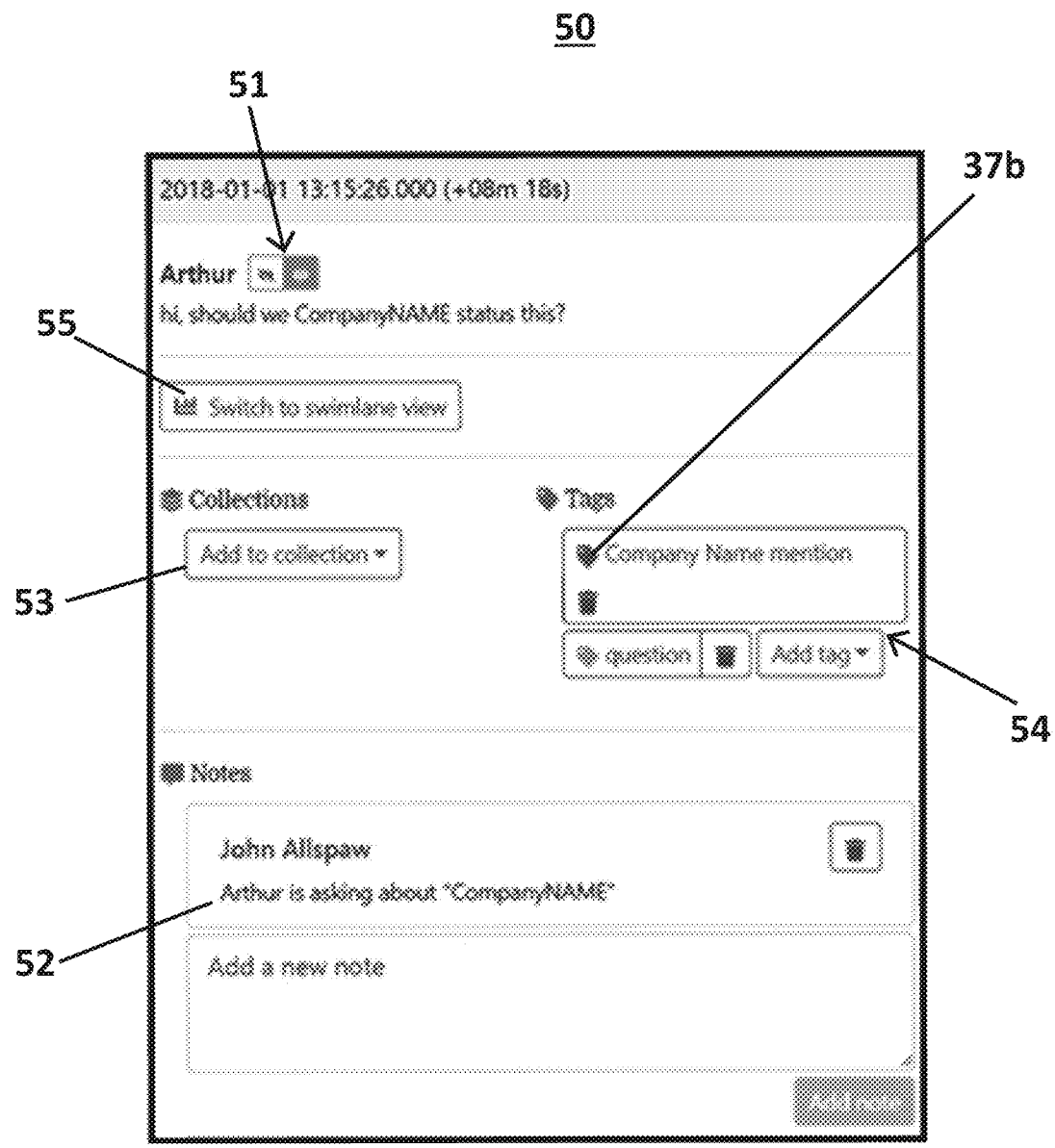
FIG. 15A, 15B are diagrams of an Event Control Panel in an embodiment of the present invention.
Figure 15B:
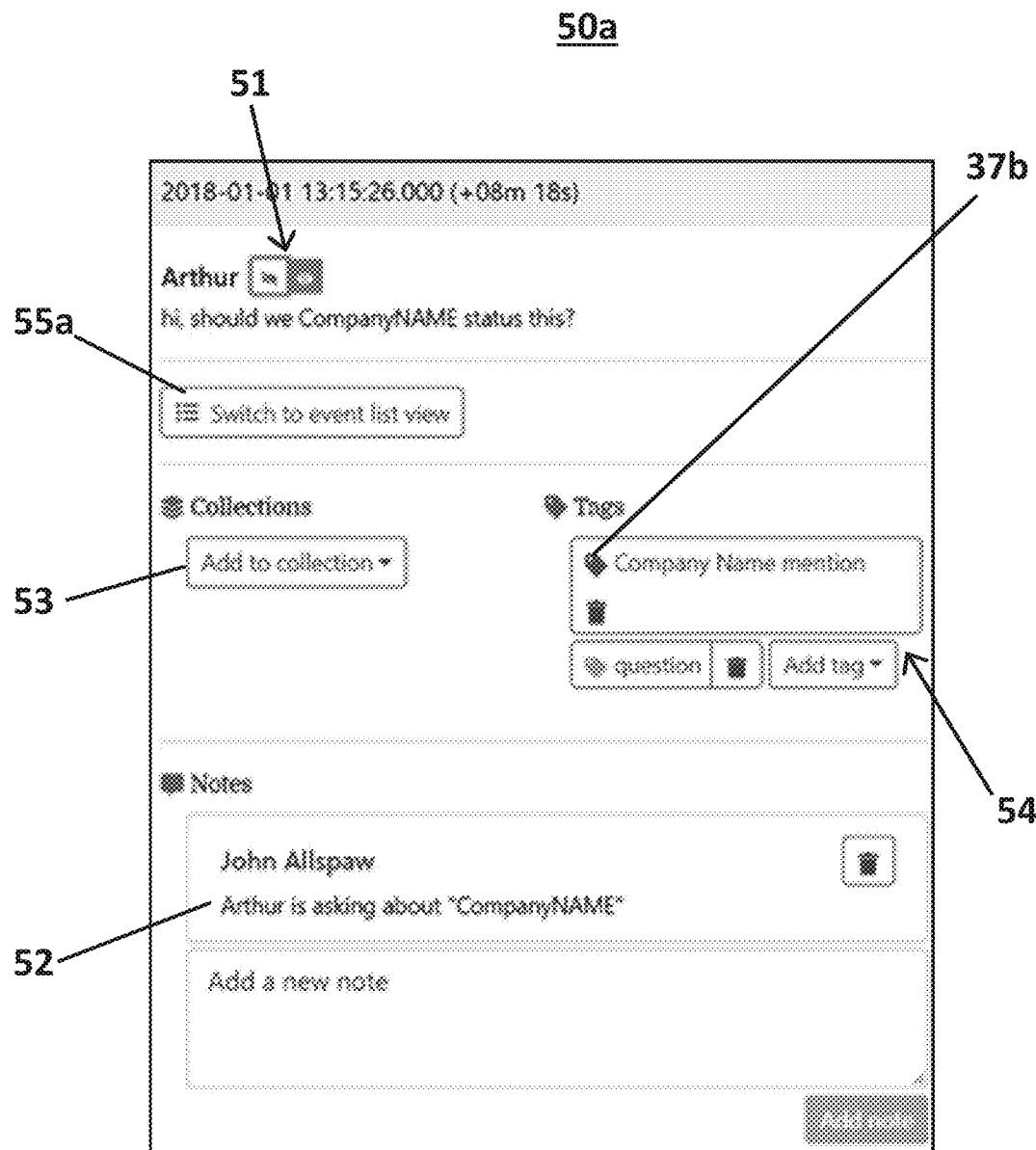

One or more events can be grouped into an event collection 43, 44, as illustrated in FIGS. 11, 12, and each event may participate in one or more event collections. Each collection may have a unique identifier, and/or a descriptive name, for example "API Discussion" for collection 43, or "Network Degradation" for collection 44. Events may be tagged (or associated) with one or more tags 37a, 37b, 37c, 37d, as shown for example in FIGS. 6, 7. FIGS. 15A and 15B, as discussed in more detail below, illustrate one way of creating tags and associating tags with events. Each tag may have a unique visual characteristic or identifier (e.g., color, patterns, shape, icon, etc.), and/or a descriptive name. For example Tag 37b, which may be red on a color display, has a name "Company Name mention," and is illustrated in FIGS. 6, 7, 10, 11 with a stippling (dotted) pattern with 25% dots. Other tags illustrated in the Figures include 37a, 37c, and 37d, each shown with a different stippling.

Figure 8:
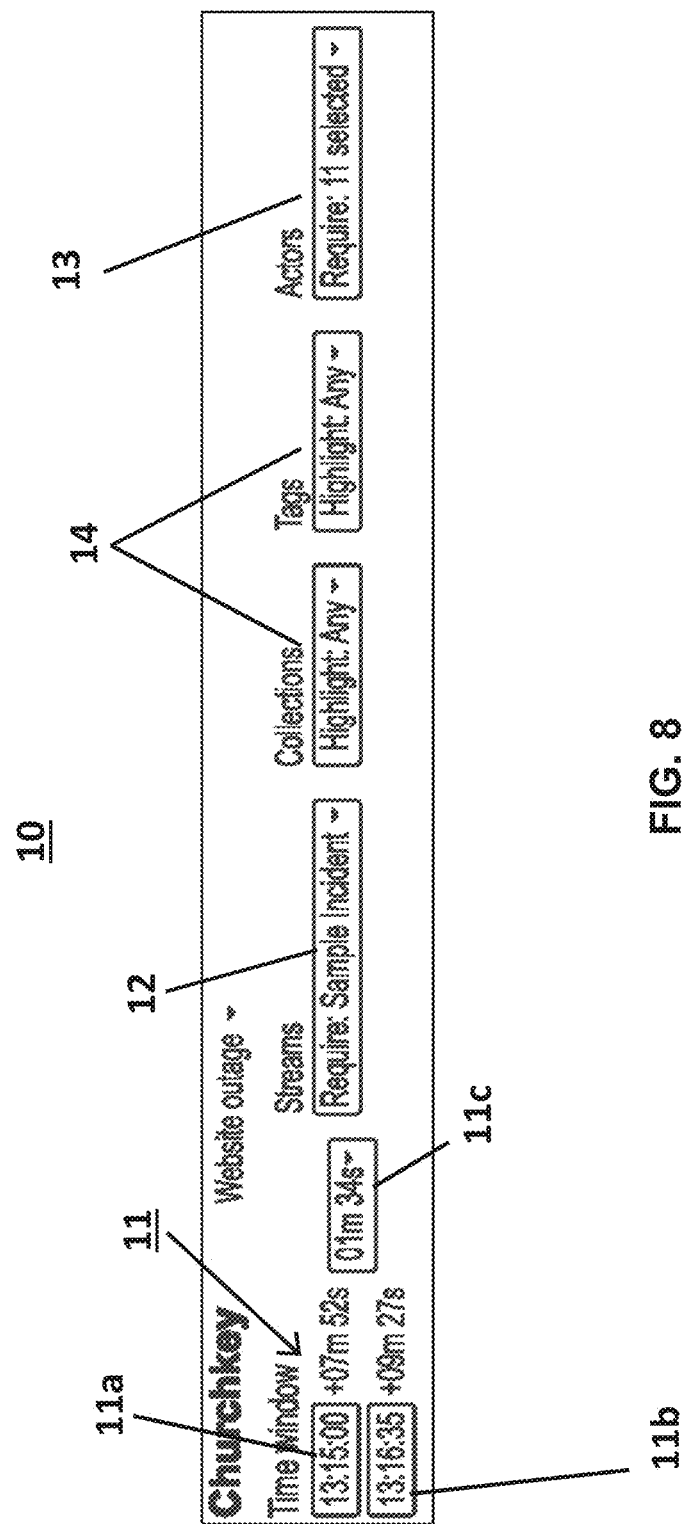
FIG. 8 is a diagram of a Control Panel of a GUI in an embodiment of the present invention.

An embodiment of a Control Panel 10, illustrated in FIG. 8, may include various user controls, for example display time interval control 11 for adjusting the display time interval, Hide/Unhide controls 12, 13 for hiding or unhiding one or more streams and/or one or more actors (event sources), and highlighting controls 14 for highlighting collections of events and highlighting tags associated with events. When an event collection 43, 44, is highlighted the Annotation Panel 30 and Event Mapping Panel 20 may visually indicate which events belong to which event collection. When a tag 37a, 37b, 37c, 37d, is highlighted the Annotation Panel 30 and Event Mapping Panel 20 may visually identify events associated with the highlighted tag. The Control Panel may also include a search box 15 for searching events. The time interval control may also indicate the start time 11a, the end time 11b, and duration 11c of the display time interval.

Figure 9:
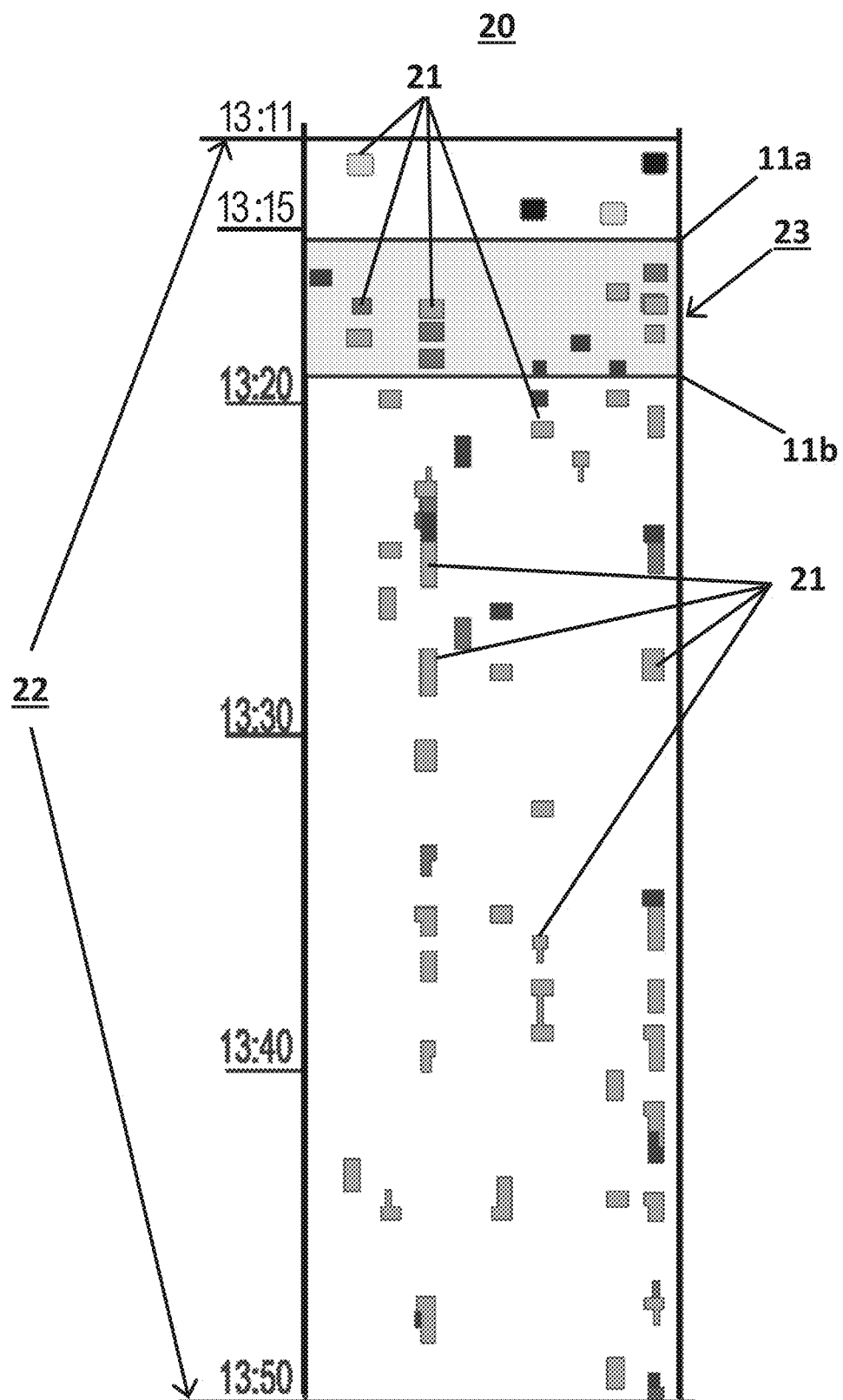
FIG. 9 is a diagram of an Event Mapping Panel of a GUI in an embodiment of the present invention.
Figure 14:
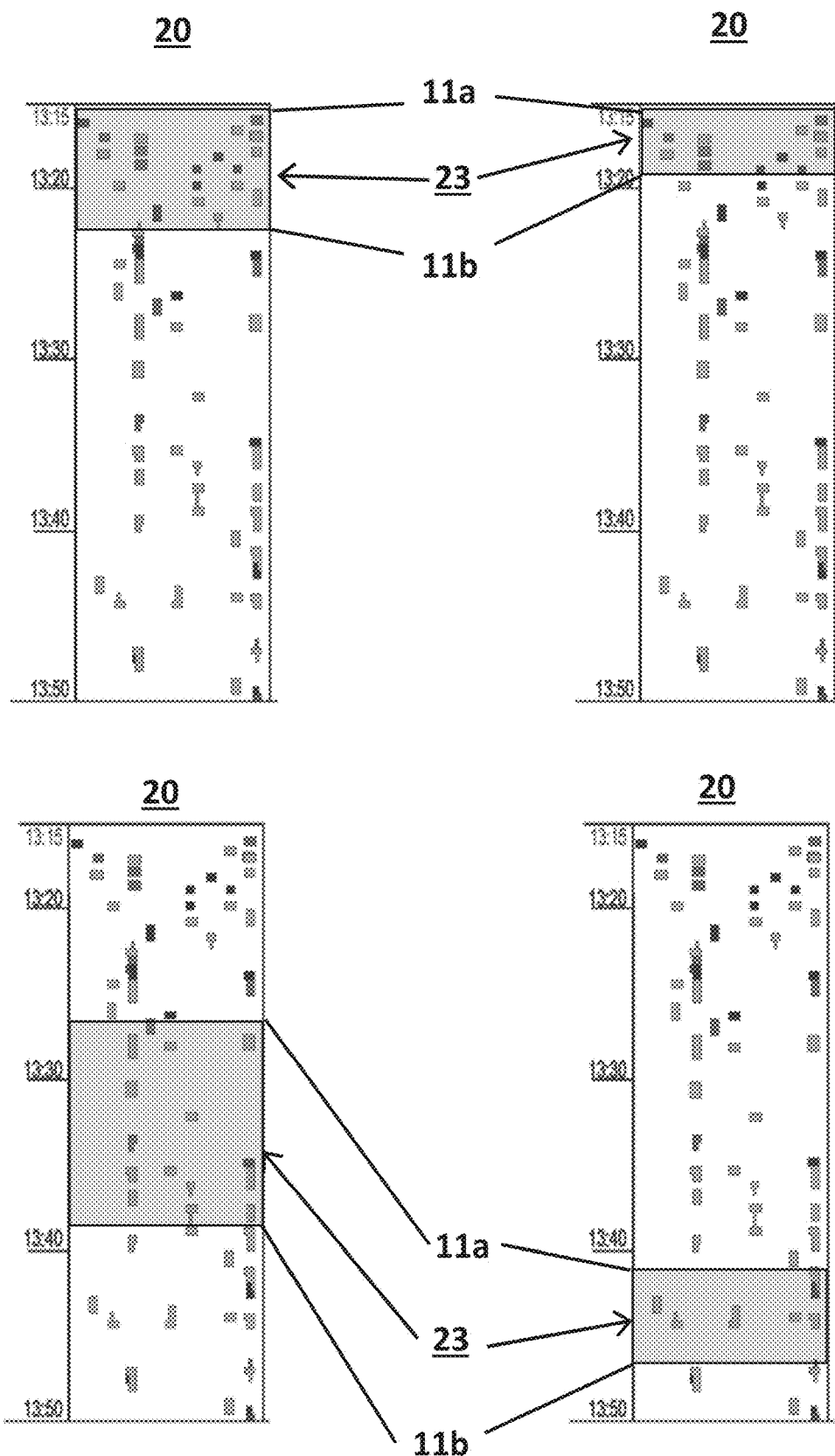
FIG. 14 is a diagram of multiple views of an Event Mapping Panel of a GUI in an embodiment of the present invention.

In the Event Mapping Panel 20 illustrated in FIG. 9 each displayable event is visually represented by an event symbol 21. Event Mapping Panel 20 displays event visual representations in the form of event symbols 21 of all displayable events during the entire time period 22 for which data is present in the data sets. Each event symbol 21 may indicate if an event is associated with one or more tags 37a, 37b, 37c, 37d, (distinguished, e.g., by color, pattern, etc.), for example, as illustrated on FIG. 9, by shading the appropriate event symbol 21 in different shades of grey. The Event Mapping Panel comprises a user adjustable display time interval selection graphic 23 that highlights the display time interval for which events are displayed in the annotation panel, and corresponds to the display time interval in control 11 in the Control Panel 10. A user may adjust the interval selection graphic 23 by clicking (or touching) and dragging the start time 11a (top border) or end time 11b (bottom border) of the graphic 23 to enlarge or reduce the display time interval, or a user may move the entire graphic 23 along the timeline to select a different time interval, as illustrated on FIG. 14.

Events from one or more data sets corresponding to the display time interval 11a-11b, selected in the Control Panel time interval control 11 or in Event Mapping Panel graphic 23 are displayed in Annotation Panel 30. Annotation Panel 30 may show displayable events in Event List View 31, or Swimlane View 41. The selected display time interval together with the portions of the data sets appearing in the Annotation Panel 30 are visually highlighted in the Event Mapping Panel using the graphic 23, as explained above. This allows an analyst to examine a specific period within the data set while maintaining orientation regarding the selected display time interval's relation to the entire time period 22, and the number of events in the selected display time interval in relation to the events in the entire time period.

The Annotation Panel 30 and Event Mapping Panel 20 are linked via the Control Panel 10 allowing manipulation of the Annotation Panel's time interval by setting the selected time interval's start and end point from the Event Mapping Panel, or by entering the start time and end time into the Control Panel. Any changes in the interval selection graphic 23 will be reflected in the interval control 11 in the Control Panel 10, and vice versa. Changes in either the interval selection graphic 23 or display time interval control 11 will update the events displayed in the Annotation Panel 30.

The GUI 4 allows the data in the Annotation Panel to be displayed in different representations or views that annotate the data. An embodiment of the invention allows data to be displayed in a Swimlane view 41, illustrated in FIG. 11, or in Event List view 31, illustrated in FIG. 10, and enables easily switching between the two views while maintaining selected display time interval, annotations, and other data manipulation. In Swimlane view 41 the data visualization allows easy observation of number, frequency and cadence of events during the selected time interval, as well visual identification of sources who were active during the interval. In Event List 31 view the data visualization allows easy visual examination of the exact sequence of events.

The Swimlane View 40 of the Annotation Panel, FIG. 11, is a graphical representation of displayable events from one or more unhidden data sets with the timestamps along the vertical axis, and actors along the horizontal axis. Each unhidden event source (or actor) 35 is represented as a column ("actor column"), in which each event 32 is represented by an event icon 42, so that the tempo and frequency of contributions from each source/actor is directly visually perceptible. The heading of each actor column identifies the event source (actor) 35 of the displayable events 32 in the actor column. For events for which an actor is not available (e.g., not provided in the data set, unknown, uncertain, etc.) the heading of actor column may be left empty, or may be indicated, for example, as "unknown," "unavailable," or similar. In Swimlane View each displayable event 32 is represented by an Event Icon 42 (e.g., geometric figure, image, thumbnail, emoji, etc.) that may be augmented to show the event's participation in a highlighted collection 43, 44, or the event's association with one or more highlighted tags 37a, 37b, 37c, 37d. For example, each highlighted collection may be represented by a line 43a, 44a, with characteristics (e.g., line style, color, weight) corresponding to that collection. Events belonging to a collection maybe visualized by connecting the events from that collection with a line characteristic of that collection. For example, in FIG. 12, collection "API Discussion" 43 is represented by a dashed line 43a, while collection "Network Degradation" 44 is represented by a solid line 44a. Instead of dashed and solid lines, different collections may be visually represented using different visual characteristics, for example different types of dashed lines (e.g., longer or shorter dashes, dotes, or combinations thereof), different colors, line weights or thicknesses, and combinations thereof.

Figure 13:
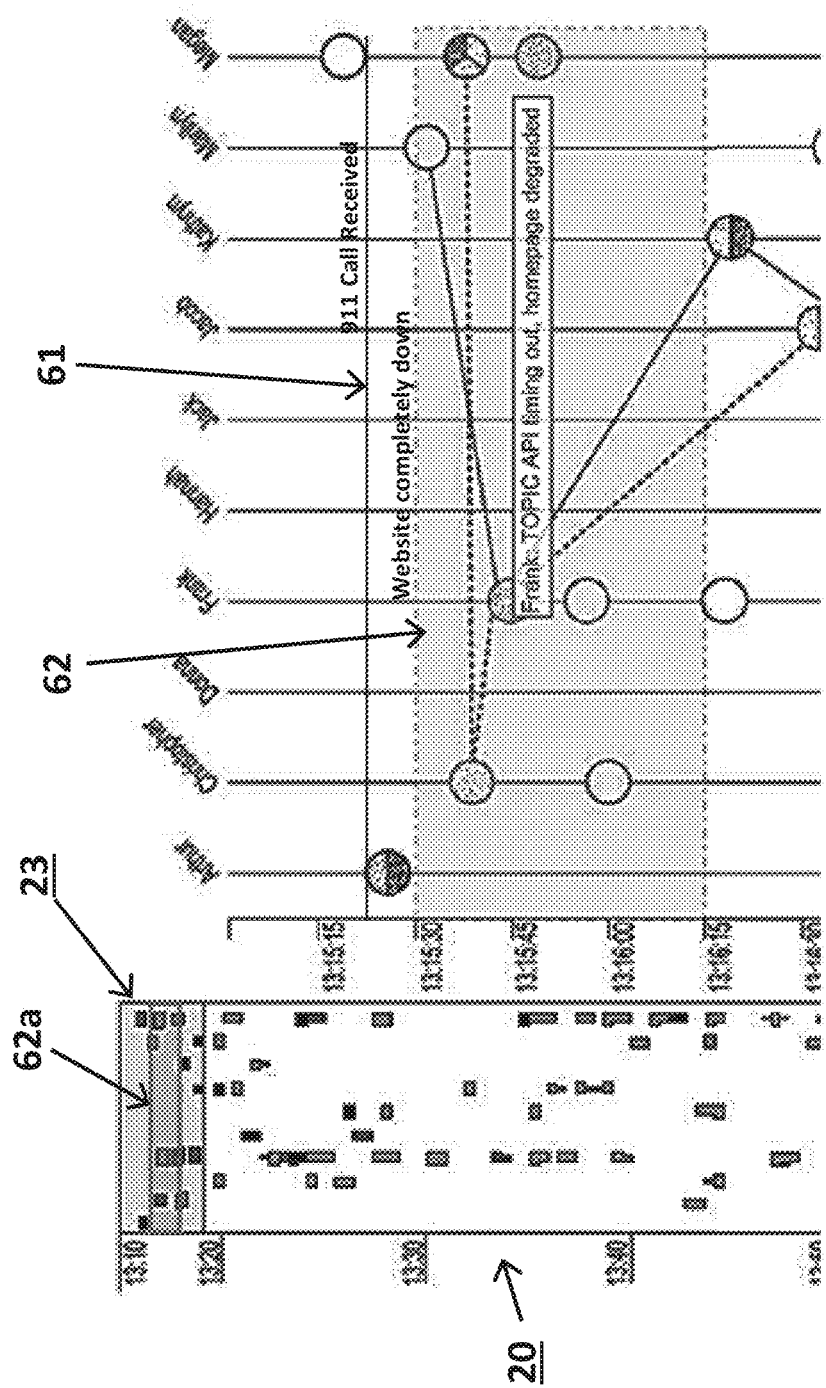
FIG. 13 is a diagram of a Swimlane View of a GUI in an embodiment of the present invention.

The Event Icons 42 may contain color, shading, patterns, images, or other visualization representing tags. For example, in one embodiment, the event icons 42 are circles containing one or more colors (represented as different levels of stippling in the Figures) indicating how many, and which highlighted tags 37a, 37b, 37c, 37d each event is associated to. For example, event icon 42a visually indicates that event 32a is associated with two highlighted tags 37a (Green—"Homepage Mention"), and 37b (Red—"Company Name"). Similarly, Event icon 42b illustrates three tags associated with event 32b. The event icon 42 may be utilized to perform different functions, for example to view the content of an event, to annotate the event, to re-arrange the actor columns, and others. For example, hovering over an event icon may show the event content (e.g., text, image, etc.) as illustrated in FIG. 13, while clicking on the icon displays an event information and control panel ("Event Control Panel") 50a illustrated in FIG. 15B. A user may also drag an event icon to re-arrange the view, for example by re-positioning the actor (event source) column to which the dragged event belongs. Instead of hover, click, and drag, a user may single click, double click, right or left click, touch with one or more fingers, etc., on the event icon to display the content, invoke the Event Control Panel 50a, or to perform other functions.

Event List View 31 is a tabular representation in which each event may be represented by a horizontal arrangement (e.g., an event row) showing the content of the event (e.g., image, text, etc.), and one or more of the event's timestamp, event source, and other details that may be available. As illustrated in FIG. 10, Event List View 31 displays events 32 from one or more unhidden data sets in vertical chronological order, with the timestamps displayed along the vertical axis in a manner that corresponds to the way that sequential or time-stamped data is normally represented by the output of commands entered from the command line, e.g., in the way that a person would see this data displayed by the computer programs usually used from the command line. The event list view 31 may comprise a selection box 33, an event timestamp 34, an event source 35, event content 36, event origin data set (not shown), representation of tags or other annotations (e.g., through color coding, patterns, etc.) 37a, 37b, 37c, 37d, visual indicators 38 of the event's association with one or more tags and/or event collections, and at least one associated user control 39. For example, as FIGS. 10, 11 illustrate, event 32a with a timestamp 34 of "13:15:19" from event source 35 of "Arthur" is associated with tags 37a, 37b. Similarly, event 32b with a timestamp 34 of "13:15:38" from event source 35 of "Megan" is associated with three tags 37b, 37c, and 37c. The associated user control 39 may be utilized to annotate (for example by adding a note, a tag, adding the event to a collection, etc.) the event, hide or unhide actors, switch the Annotation Panel 30 to a different view, and other functions. In some embodiments, shown in FIGS. 10, 15A, the associated user control 38 is a button, which displays Event Control Panel 50. In some embodiments, shown in FIGS. 11, 15B, the associated user control 38 is a button, which displays the Event Control Panel 50. In event list view actor 35 identifies the event source (actor) of the displayable event 32. For events for which an actor is not available (e.g., not provided in the data set, unknown, uncertain, etc.) the actor 35 may be left empty, or may indicate, for example, "unknown," "unavailable," or similar.

Event Control Panel 50, 50a shown on FIGS. 15A, 15B, displays available information about an event 32, and may also provide user controls, for example Hide Control 51 to hide or unhide all events from the event's actor; Note Control 52 to add notes to an event; Collections Control 53 to add the event to an event collection 43, 44, or to create, label, and retrieve event collections 43, 44; Tag Control 54 to create and attach Tags 37*a*, 37*b*, 37*c*, 37*d*, to events. Event Control Panel 50, 50*a* also provides a View Control 55, 55*a* that switches the view of the Annotation Panel 30 from Event List View 31 to Swimlane View 41, and from Swimlane View 41 to Event List View 31.

Figure 16A:
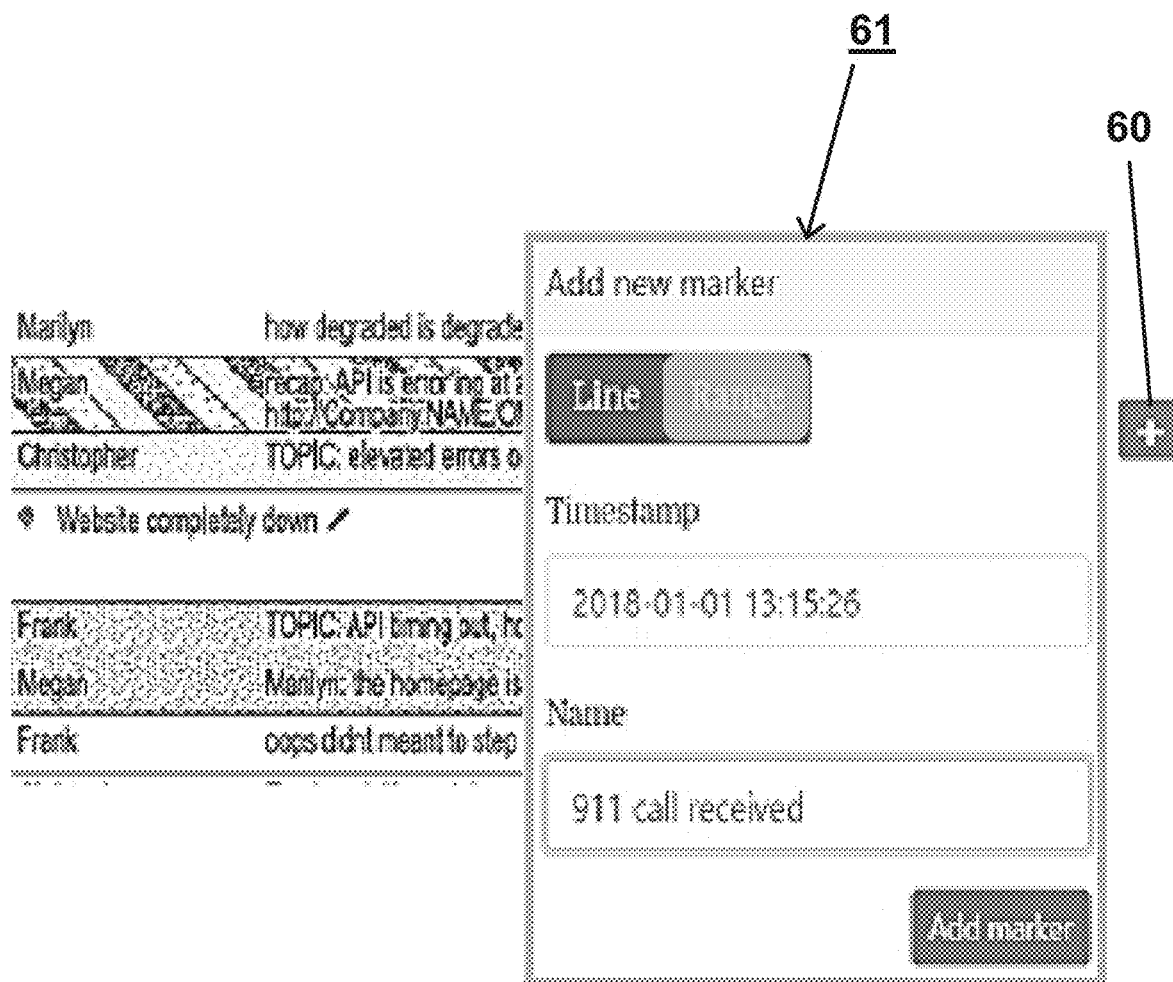
FIG. 16A, 16B are diagrams of visual user controls in an embodiment of the present invention.
Figure 16B:
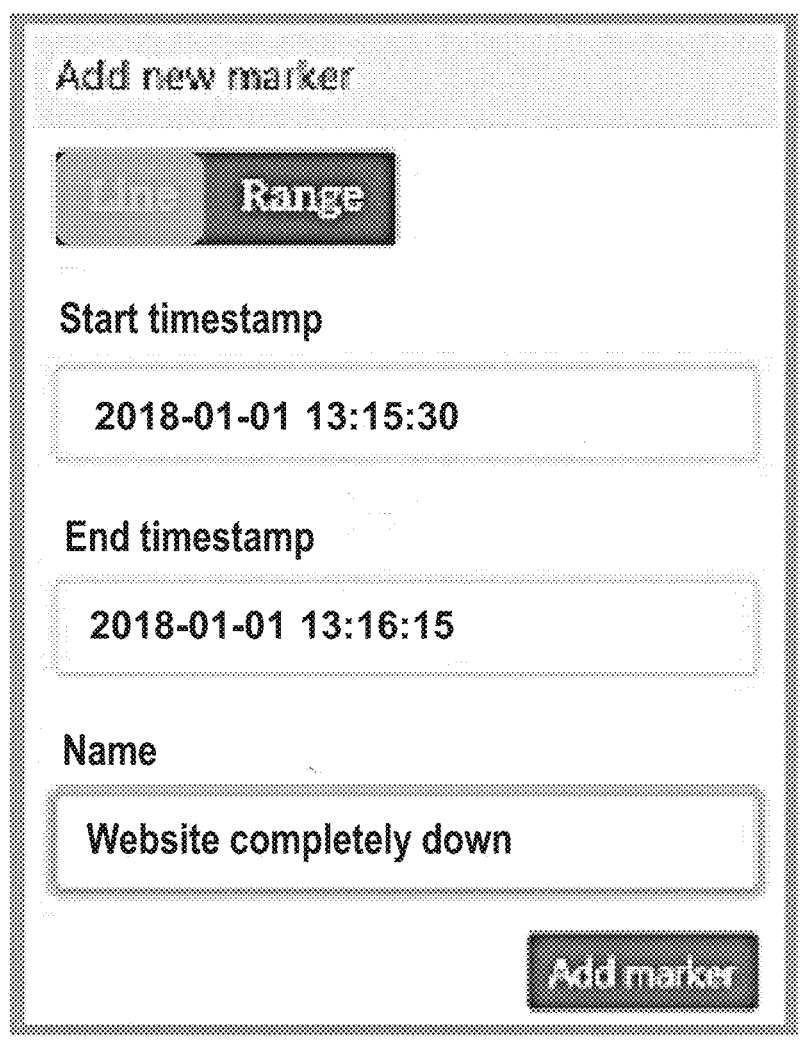

The Annotation Panel 30 may also provide a user marker control 60 that when activated brings up maker control panel illustrated on FIGS. 16A, B, allowing the creation of Markers 61 or Marker ranges 62, visually indicating a specific time (e.g., "Line") or time range (e.g., "Range"). Markers may represent occurrences or circumstances that may be important to the analyzable incident, for example time of "911 call received" marker 61, or time range of "Website completely down" marker range 62. The Annotation Panel 30 provides visual indications of Markers 61 and Marker Ranges 62 as illustrated on FIG. 13 for Swimlane View 41, and on FIG. 10 for Event List View 31, allowing observation of events that occurred contemporaneously with occurrences or circumstances represented by the Markers or Marker Ranges. The Event Mapping Panel 20 also may visualize the location of Markers 61 (not shown) and the range 62*a* of Marker Ranges 62.

While the invention has been described with reference to exemplary embodiments, it will be understood by those skilled in the art that various changes, omissions, and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiments disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

We claim:

1. An apparatus for investigating an analyzable incident for a period of time, the apparatus comprising:
   a database that receives and stores one or more data sets for the period of time; wherein each of the one or more data sets comprises a series of events about the analyzable incident, wherein each event comprises:
   a timestamp;
   a source; and,
   a content;
   a data processing computer system coupled to the database that operates upon the one or more data sets, wherein the data processing computer system obtains the one or more data sets; and,
   a display module coupled to the data processing computer system, wherein the display module:
   displays a graphical user interface;
   enables a user to select displayable events from the series of events in the one or more data sets; and,
   enables the user to annotate each displayable event; and,
   wherein the graphical user interface comprises:
   a control panel; and,
   an annotation panel displaying each displayable event within a display time interval;
   wherein the annotation panel is viewable in an event list view or a swimlane view;
   wherein the event list view comprises a tabular list of the timestamp, the source and the content of each event, wherein each event has an associated user control;
   wherein the associated user control allows the user to annotate each event by utilizing the associated user control;
   wherein the associated user control allows the user to view the annotation panel in the swimlane view by utilizing the associated user control;
   wherein the swimlane view comprises a graphical representation of the timestamp and the source of each event, and at least one user selectable icon associated with the content of each event, wherein the timestamps are represented on a vertical (y) axis of an x-y axis and the sources are represented on a horizontal (x) axis;
   wherein the user selectable icon allows the user to annotate each event by utilizing the user selectable icon; and,
   wherein the user selectable icon allows the user to view the annotation panel in the event list view by utilizing the user selectable icon.

2. The apparatus of claim 1, wherein the graphical user interface further comprises an event mapping panel displaying a visual representation of all the displayable events;
   wherein the event mapping panel comprises a user selectable graphic indicating the display time interval;
   wherein the user selectable graphic allows the user to select a changed display time interval; and,
   wherein, in response to the user selecting the changed display time interval utilizing the user selectable graphic, the annotation panel displays each displayable event within the changed display time interval.

3. The apparatus of claim 2, wherein the control panel comprises a control panel user control allowing the user to select an adjusted display time interval;
   wherein, in response to the user selecting the adjusted display time interval, the user selectable graphic of the event mapping panel indicates the adjusted display time interval; and,
   wherein, in response to the user selecting the adjusted display time interval, the annotation panel displays each displayable event within the adjusted display time interval.

4. The apparatus of claim 3, wherein the display module further enables the user to create one or more tags and to create one or more event collections;
   wherein the associated user control and the user selectable icon allow the user to annotate each displayable event by adding the one or more tags to the event;
   wherein the associated user control and the user selectable icon allow the user to annotate each displayable event by including the event into the one or more event collections;
   wherein the swimlane view further comprises a graphical representation of each displayable event visually indicating the event's inclusion in the one or more event collections; and,
   wherein the user selectable icon visually indicates any of the one or more tags added to the event.

5. The apparatus of claim 4, wherein the event mapping panel visually indicates the one or more tags added to each displayable event.

6. The apparatus of claim 5, wherein the event mapping panel visually indicates each displayable event's inclusion in the one or more event collections.

7. The apparatus of claim 1, wherein the associated user control allows the user to hide/unhide the one or more data sets and to hide/unhide the source.

8. The apparatus of claim 4, wherein the control panel user control allows the user to select which of the one or more tags to be visually represented in the displayable event; and, wherein the control panel user control allows the user to select which of the one or more tags to be included in which of the one of more event collections to be visually indicated in the displayable event.

9. A computer-implemented method for interactive visualization of data about an analyzable incident and for investigating the analyzable incident for a period of time, the method comprising:
obtaining one or more data sets for the period of time by a data processing computer system coupled to a database, wherein each of the one or more data sets comprises a series of events about the analyzable incident during the period of time, wherein each event comprises:
a timestamp;
a source; and,
a content;
storing the one or more data sets on the database; and,
displaying a graphical user interface on a display module coupled to a data processing computer system;
wherein the display module enables a user to select displayable events from the series of events in the one or more data sets;
wherein the display module enables the user to annotate each displayable event; and,
wherein the graphical user interface comprises:
a control panel; and,
an annotation panel displaying each displayable event within a display time interval;
wherein the annotation panel is viewable in an event list view or a swimlane view;
wherein the event list view comprises a tabular list of the timestamp, the source and the content of each event, wherein each event has an associated user control;
wherein the associated user control allows the user to annotate each event by utilizing the associated user control;
wherein the associated user control allows the user to view the annotation panel in the swimlane view by utilizing the associated user control;
wherein the swimlane view comprises a graphical representation of the timestamp and the source of each event, and at least one user selectable icon associated with the content of each event, wherein the timestamps are represented on a vertical (y) axis of an x-y axis and the sources are represented on a horizontal (x) axis;
wherein the user selectable icon allows the user to annotate each event by utilizing the user selectable icon; and,
wherein the user selectable icon allows the user to view the annotation panel in the event list view by utilizing the user selectable icon.

10. The method of claim 9, wherein the graphical user interface further comprises an event mapping panel displaying a visual representation of all the displayable events;
wherein the event mapping panel comprises a user selectable graphic indicating the display time interval;
wherein the user selectable graphic allows the user to select a changed display time interval; and
wherein, in response to the user selecting the changed display time interval utilizing the user selectable graphic, an annotation display panel displays each displayable event within the changed display time interval.

11. The method of claim 10, wherein the control panel comprises a control panel user control allowing the user to select an adjusted display time interval;
wherein, in response to the user selecting the adjusted display time interval, the user selectable graphic of the event mapping panel indicates the adjusted display time interval; and,
wherein, in response to the user selecting the adjusted display time interval, the annotation panel displays each displayable event within the adjusted display time interval.

12. The method of claim 11, wherein the display module further enables the user to create one or more tags and to create one or more event collections;
wherein the associated user control and the user selectable icon allow the user to annotate each displayable event by adding the one or more tags to the event;
wherein the associated user control and the user selectable icon allow the user to annotate each displayable event by including the event into the one or more event collections;
wherein the swimlane view further comprises a graphical representation of each displayable event visually indicating the event's inclusion in the one or more event collections; and,
wherein the user selectable icon visually indicates any of the one or more tags added to the event.

13. The method of claim 12, wherein the event mapping panel visually indicates the one or more tags added to each displayable event.

14. The method of claim 13, wherein the event mapping panel visually indicates each displayable event's inclusion in the one or more event collections.

15. The method of claim 9, wherein the associated user control allows the user to hide/unhide the one or more data sets and to hide/unhide the source.

16. The method of claim 12, wherein the control panel user control allows the user to select which of the one or more tags to be visually represented in the displayable event; and,
wherein the control panel user control allows the user to select which of the one or more tags to be included in which of the one of more event collections to be visually indicated in the displayable event.

* * * * *